United States Patent [19]

Dunham

[11] Patent Number: 4,989,580
[45] Date of Patent: Feb. 5, 1991

[54] DUAL GRILL COOKING APPARATUS

[76] Inventor: Jimmie W. Dunham, 9148 S. Blackwater Rd., Baton Rouge, La. 70818

[21] Appl. No.: 490,148

[22] Filed: Mar. 7, 1990

[51] Int. Cl.[5] .......................... A47J 37/00; F24C 3/00
[52] U.S. Cl. .................................. 126/41 R; 126/51; 99/374; 99/379
[58] Field of Search ............... 126/41 R, 41 E, 39 R, 126/50, 39 C, 39 J, 39 K, 91 A, 214 R, 214 D, 51, 25 A; 99/374, 379, 446, 444, 418, 416, 340

[56] References Cited

U.S. PATENT DOCUMENTS

| | | | |
|---|---|---|---|
| 265,391 | 10/1882 | Cottingham | 99/444 |
| 1,294,159 | 2/1919 | Potts | 99/446 |
| 1,922,838 | 8/1933 | Bossart | 165/177 |
| 2,543,835 | 3/1951 | Dewey | 126/391 |
| 2,712,308 | 7/1955 | Keating | 126/391 |
| 2,723,617 | 11/1955 | Dreyfus | 99/444 |
| 2,756,321 | 7/1956 | Pappas | 126/391 |
| 2,898,846 | 8/1959 | Del Francia | 99/443 |
| 3,320,873 | 5/1967 | Nissen | 99/423 |
| 3,448,678 | 6/1969 | Burstein | 99/386 |
| 3,472,156 | 10/1969 | Bardeau | 99/423 |
| 3,640,208 | 2/1972 | Size | 99/403 |
| 3,763,846 | 10/1973 | Schantz | 126/41 R |
| 4,209,006 | 6/1980 | Marsalko | 126/25 R |
| 4,442,824 | 4/1984 | Amici | 126/14 |
| 4,478,205 | 10/1984 | Koziol | 126/25 R |
| 4,580,549 | 4/1986 | Sato | 126/391 |
| 4,697,504 | 10/1987 | Keating | 126/41 R |
| 4,776,319 | 10/1988 | Colangelo et al. | 126/41 R |
| 4,905,664 | 3/1990 | Dunham | 126/41 R |

Primary Examiner—James C. Yeung
Attorney, Agent, or Firm—William David Kiesel; Robert C. Tucker; Timothy J. Monahan

[57] ABSTRACT

An apparatus for simultaneously grilling food from above and below is provided having upper and lower grilling surfaces of gas fired tubes. The upper grill is hinged to lift up and provide access to the food and is vertically adjustable to accommodate variations in thickness of the item being cooked. The upper and lower grills are supported on a frame having a supply of combustion gases and induced draft exhaust system.

20 Claims, 2 Drawing Sheets

DUAL GRILL COOKING APPARATUS

BACKGROUND OF THE INVENTION

1. Field of the Invention

This invention relates generally to cooking apparatus for grilling food and in particular to an apparatus with dual grills which simultaneously cook food from the top and bottom. Each of the grills comprise an array of gas fired tubes forming level cooking surface.

2. Prior Art

An example of a gas fired grill or broiler may be found in Potts, U.S. Pat. No. 1,294,159. The grill has a rack of tubes arranged to form a planar cooking surface. Combustion gases enter an intake manifold at one end of the tubes and exit an exhaust duct connected to the opposite end of the tubes. The tubes may be enclosed in an oven type chamber and a drip pan is placed below the tubes. Individual tubes may be removed from the rack for cleaning or replacement, but the entire rack of tubes is not easily removed. The food being cooked must be turned periodically to insure that it cooks evenly as heat is supplied only from below.

An example of a gas fired cooking apparatus which simultaneously cooks from above and below is disclosed in Dreyfus U.S. Pat. No. 2,723,617. The racks of tubes in Dreyfus' apparatus are perforated burners which distribute a flame along their length. The pipes are not placed in contact with the food but rather the food is supported on cross bars above the pipes. One disadvantage of the aforementioned design is that the food to be cooked comes in contact with the combustion gases which may impart an undesirable flavor.

In Amici, U.S. Pat. No. 4,442,824 a gas fired apparatus is shown as an upper heat source for an outdoor grill. As in Dreyfus, a flame is distributed along a length of pipe. Small bricks suspended above the food absorb the heat and radiate it downward. Food is exposed to the combustion gases within the grill.

Individual electrical heating elements within a row of tubes are used in the following patents for cooking apparatus:

| Nissen, et al. | U.S. Pat. No. | 3,320,873 |
| Burstein | U.S. Pat. No. | 3,448,678 |
| Bardeau, et al. | U.S. Pat. No. | 3,472,156 |

The heated tubes in Nissen, et al. and Bardeau, et al. are in direct contact with the food as with the gas fired tubes used by Potts. Burstein discloses a radiant heat cooker with heated tubes both above and below a conveyor supporting the food. A shortcoming of electrically heated tubes is that they are slower to heat up and slower to respond to adjustments than gas fired cooking equipment

SUMMARY OF THE INVENTION

Therefore, an object of this invention is to provide a gas fired cooking apparatus that does not expose food to combustion gases.

Another object of this invention is to provide a cooking apparatus which grills food both from above and below.

Yet another object of this invention is to maximize heat transfer between the grill and the food being cooked, preferably by direct contact.

Still another object of this invention is to provide a cooking apparatus which is adjustable to accommodate a variety of sizes and shapes of food and is easily disassembled for cleaning.

Accordingly, a cooking apparatus is provided with an upper and lower grill, each made up of a set of hollow tubes. Combustion gases are introduced into the tubes of each grill through an intake manifold. An exhaust fan draws the hot combustion gases through the tubes and out an exhaust manifold. The upper grill is hinged at one edge allowing one to open the apparatus and place food on the lower grill. The upper grill is also vertically adjustable to be placed in contact with the top surface of food lying on the lower grill when the apparatus is closed.

DESCRIPTION OF THE PREFERRED EMBODIMENT

Without limiting the scope of the invention, a description of the preferred features of the invention is hereinafter set forth.

In general, the cooking apparatus has as an upper and lower gas fired grill supported by a frame. The upper grill may be raised so that steak, chicken and the like may be placed on the lower grill. The upper grill can then be lowered to rest on the food, which is cooked on two sides at once. Each of the grills are made up of a set of hollow tubes. Combustion gases are supplied at one end of the tubes and an exhaust system contains the gases exiting at the opposite end. Suitable gases for heating the tubes are methane, ethane, propane or butane. Other methods for producing hot gases to heat the tubes of the grills may be employed without deviating from the scope of the invention.

Figure 1:
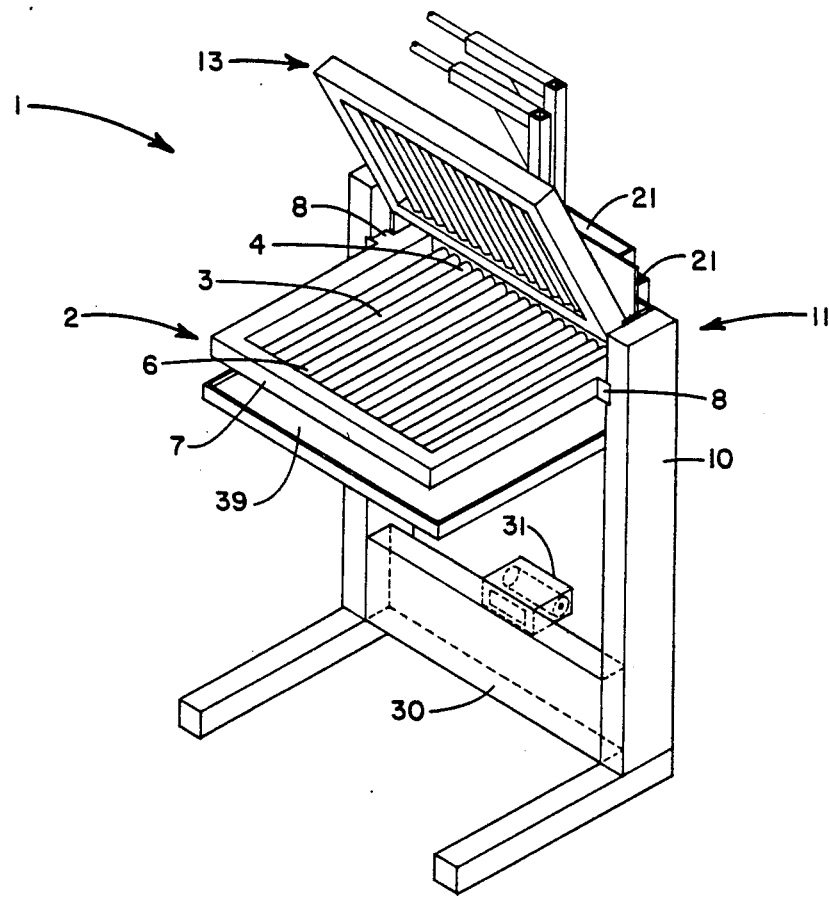
FIG. 1 is a perspective view of the front of the cooking apparatus.

Referring to FIG. 1, cooking apparatus 1 has lower grill 2 made up of parallel tubes 3 arranged to form a planar cooking surface. Tubes 3 have an intake end 4 connected to intake manifold 5 shown in FIGS. 2 and 4. Combustion gases are delivered to intake manifold 5 where they are drawn through tubes 3. The combustion gases or exhaust gases exit tubes 3 at exhaust end 6. Exhaust manifold 7 directs the exhaust gases from exhaust end 6 back around the sides of lower grill 2. Exhaust manifold 7 has outlets 8 which engage slotted openings 9 in exhaust ducts 10.

Figure 2:
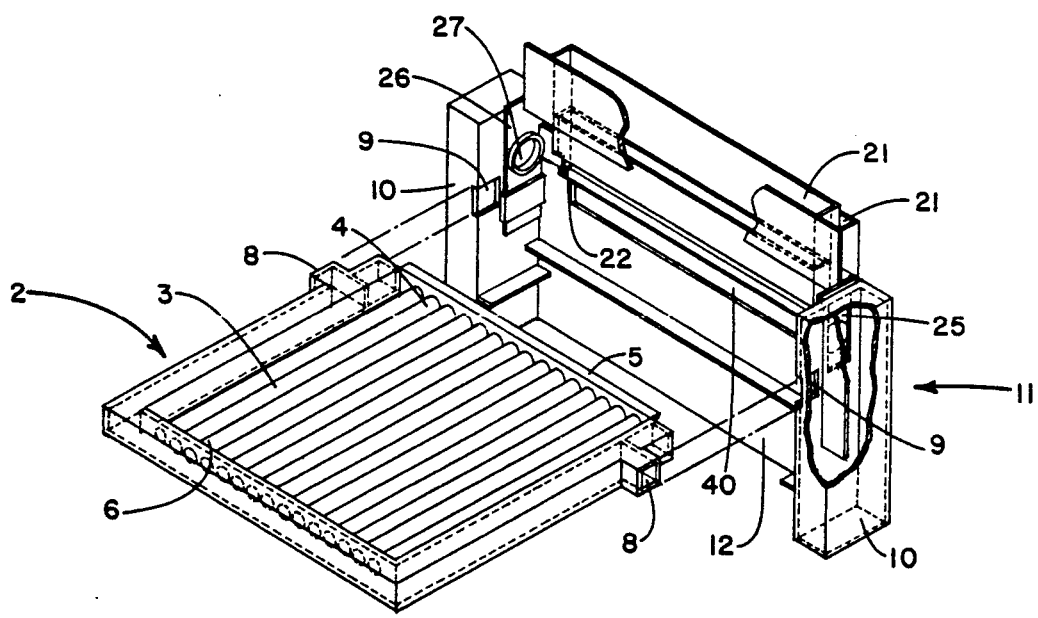
FIG. 2 is an exploded view of the cooking apparatus.

Exhaust ducts 10 are part of frame 11 which support lower grill 2 horizontally. Frame 11 also has back plate 12 with slit 40 to receive intake manifold 5 of lower grill 2. As shown in FIG. 2, lower grill 2 may be disengaged from frame 11 for cleaning or repair. However, during operation, lower grill 2 and the portion of frame 11 to which it is connected, remain stationary.

Upper grill 13 has edge 14 pivotally connected to frame 11. Upper grill 13 has parallel tubes 15 which are arranged in a plane. Upper grill 13 is movable from a first position parallel to and overlying lower grill 2 to a retracted position as shown in FIG. 1, which would allow one access to the food on lower grill 2. Additionally, the portion of frame 11 connected to edge 14 of upper grill 13 is vertically extendable to accommodate various thickness of food between the two grills.

Figure 3:
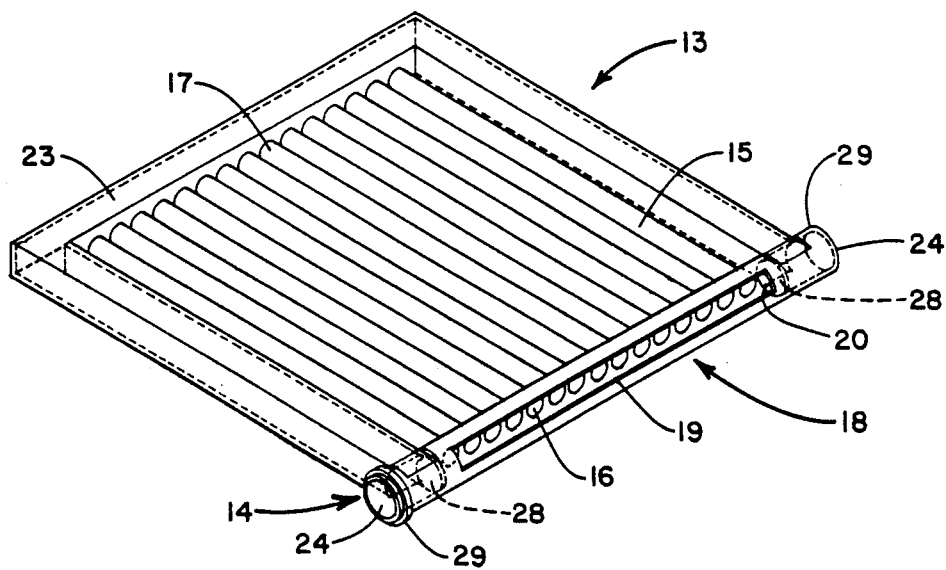
FIG. 3 is a detailed view of the upper grill.

Each of tubes 15 of upper grill 13 have an intake end 16 and an exhaust end 17. Referring to FIG. 3, intake manifold 18 is connected to intake ends 16 of tubes 15. In a preferred embodiment, intake manifold 18 is made up of an elongated cylindrical chamber 19 having a side connected to intake ends 16 and a slotted inlet 20 opposite intake ends 16. Chamber 19 is in communication with intake duct 21 of frame 11. Intake duct 21 has a convex shaped opening 22 which conforms to the shape of chamber 19 shown in FIG. 2. Thus, when upper grill 13 is pivoted on edge 14, inlet 20 of chamber 19 continuously receives combustion gases from opening 22 in intake duct 21. Alternatively, chamber 19 could be concave and opening 22 could be convex.

Combustion gases entering tubes 15 of upper grill 11 exit as exhaust gases at exhaust ends 17. An exhaust manifold 23 is connected to exhaust ends 17 and directs the exhaust gases back around to edge 14. Exhaust manifold 23 has outlets 24 centered on edge 14 which are in communication with openings 25 in exhaust ducts 10. Since upper grill 13 may be vertically adjusted it is important that the flow of combustion gases to upper grill 13 and the flow of exhaust gases to exhaust ducts 10 remain uninterrupted. Referring to FIG. 2, intake duct 10 of frame 11 is vertically adjustable relative to back plate 12 supporting lower grill 2. Additionally, openings 25 in exhaust ducts 10 are covered with plates 26 having flanged holes 27. Plates 26 are connected to intake duct 21 and are slidable therewith.

Referring to FIG. 3, edge 14 of upper grill 13 is separated into chamber 19 and outlets 24 of exhaust manifold 23 by seals 28 shown in the cutaway view. Outlet 24 has neck 29 which is inserted into hole 27 of plate 26 during operation. Upper grill 13 can be disengaged from frame 11 by sliding edge 14 sideways until neck 29 is removed from hole 27 on first one side then the other.

Exhaust gases from both lower grill 2 and upper grill 13 are drawn into exhaust ducts 10. Main duct 30 connects exhaust ducts 10 along the bottom of back plate 12. Referring to FIG. 2, exhaust fan 31 is positioned in main duct 30 to induce a draft through the exhaust system and ultimately to draw combustion gases through tubes 3 and tubes 15 of lower grill 2 and upper grill 13, respectively.

Figure 4:
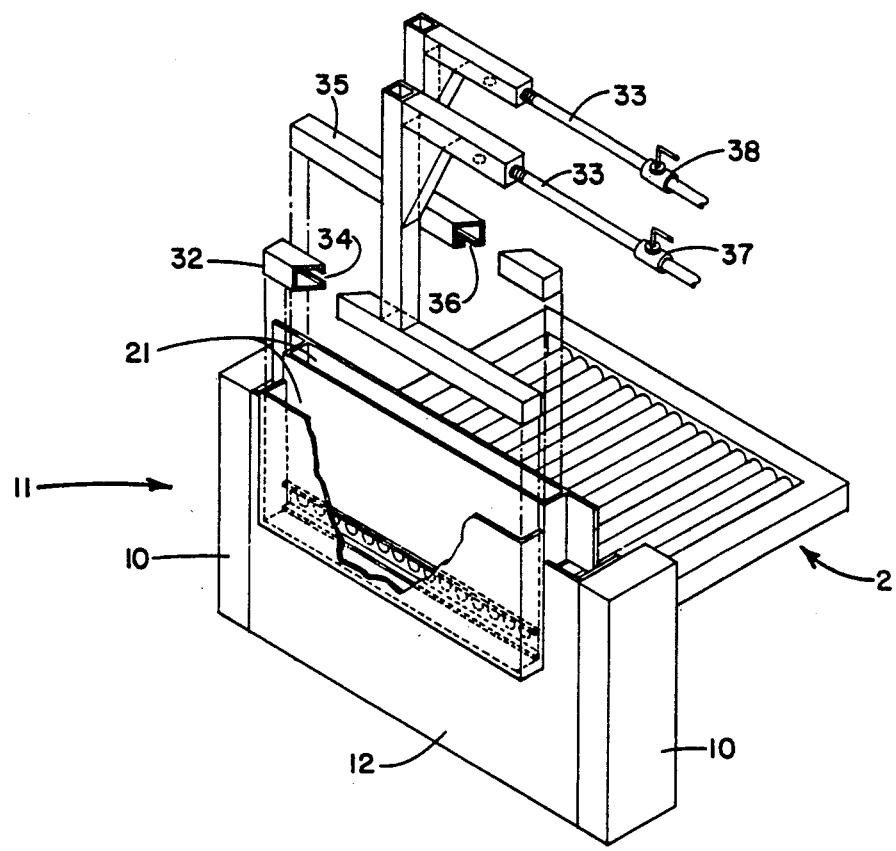
FIG. 4 is a detailed view of the burners for the upper and lower grills.

As shown in FIG. 4, frame 11 has a separate means to deliver combustion gases to lower grill 2 and upper grill 13. Burner body 32 is connected to frame 11 opposite intake manifold 5 of lower grill 2. A gas line 33 is connected to burner body 32 which in turn distributes the gas along slot 34. Alternatively, burner body 32 may have a series of holes corresponding to tubes 3 of lower grill 2.

Combustion gas is supplied to intake manifold 18 of upper grill 13 by burner body 35 inserted in intake duct 21. Burner body 35 has slot 36 for distributing gas supplied from gas line 33. Valves 37 and 38 are supplied on gas line 33 to individually control the temperature of lower grill 2 and upper grill 13. Oxygen for combustion is drawn into intake manifolds 5 and 18 to mix with the gas by the pressure differential created by exhaust fan 31.

Referring back to FIG. 1, drip pan 39 is provided below lower grill 2 to collect juices from the food being cooked. Pan 39 may be removed from frame 11 for emptying and cleaning.

There are, of course, many alternate embodiments and modifications which are intended to be included within the following claims.

What I claim is:

1. A cooking apparatus, comprising a first set of parallel tubes arranged in a plane, said tubes having an intake end and an exhaust end, means to deliver combustion gases to said intake ends of said first set of tubes, means connected to said exhaust ends of said first set of tubes for directing said combustion gases away from said first set of tubes, means to urge said combustion gases through said first set of tubes, a second set of parallel tubes arranged in a plane, said tubes having an intake end and an exhaust end, means to deliver combustion gases to said intake ends of said second set of tubes, means connected to said exhaust ends of said second set of tubes for directing said combustion gases away from said second set of tubes, means to urge said combustion gases through said second set of tubes, means to support said first set of tubes in a raised, horizontal position, and means to alternately support said second set of tubes in a first position parallel to and proximate to said first set of tubes, wherein said first and second tubes are in vertical alignment, and a second position wherein said second set of tubes is retracted from said first set of tubes.

2. A cooking apparatus according to claim 1 wherein said means to direct said combustion gases away from said first set of tubes and said means to direct combustion gases away from said second set of tubes, comprises an exhaust duct.

3. A cooking apparatus according to claim 2 wherein said means to urge combustion gases through said first set of tubes and said means to urge combustion gases through said second set of tubes, comprises an exhaust fan connected to said exhaust duct.

4. A cooking apparatus according to claim 1 wherein said second set of tubes has an edge pivotally connected to said support means for said second set of tubes.

5. A cooking apparatus, comprising:
   (a) a first grill having a set of parallel tubes arranged in a plane, said tubes having an intake end and an exhaust end, a first intake manifold connected to said intake ends of said tubes and a first exhaust manifold connected to said exhaust ends of said tubes;
   (b) a second grill having a set of parallel tubes arranged in a plane, said tubes having an intake end and an exhaust end, a second intake manifold connected to said intake ends of said tubes and a second exhaust manifold connected to said exhaust ends of said tubes;
   (c) means to deliver combustion gases to said first intake manifold;
   (d) means to deliver combustion gases to said second intake manifold;
   (e) an exhaust duct receiving said combustion gases from said first exhaust manifold and said second exhaust manifold;
   (f) means to support said first grill in a raised, horizontal position;
   (g) means to support said second grill in a first position parallel to and above said first grill and to support said second grill in a second position retracted from said first grill relative to said first position.

6. A cooking apparatus according to claim 5 further comprising an exhaust fan connected to said exhaust duct.

7. A cooking apparatus according to claim 5, wherein said means to support said first grill and said second grill comprises a frame and an edge of said second grill is pivotally connected to said frame forming a hinge.

8. A cooking apparatus according to claim 7, wherein said frame comprises means to vertically adjust a distance between said first grill and said second grill.

9. A cooking apparatus according to claim 7 wherein said second intake manifold has an elongated chamber located at said edge of said second grill with an inlet therein.

10. A cooking apparatus according to claim 9 wherein said means to deliver combustion gases to said second intake manifold comprises an intake duct having an opening in communication with said inlet in said chamber.

11. A cooking apparatus according to claim 10 wherein said intake duct and said chamber are matingly slidable as said second grill is moved from said first position to said second retracted position.

12. A cooking apparatus according to claim 10 wherein said second exhaust manifold comprises an outlet located at said edge of said second grill and said exhaust duct has an opening in communication with said second exhaust manifold outlet.

13. A cooking apparatus, comprising:
a first grill having a set of parallel tubes arranged in a plane, said tubes having an intake end and an exhaust end, a first intake manifold connected to said intake ends of said tubes, said first intake manifold having an inlet therein, a first exhaust manifold connected to an exhaust end of said tubes, said first exhaust manifold having an outlet therein;
a second grill having a set of parallel tubes arranged in a plane, said tubes having an intake end and an exhaust end, a second intake manifold connected to said intake ends of said tubes, said second intake manifold having an inlet therein, a second exhaust manifold connected to an exhaust end of said tubes, said second exhaust manifold having an outlet therein;
a support frame having means to deliver combustion gases to said first grill, an intake duct with an opening therein, an exhaust duct with first and second openings therein, means to slidably engage said first grill in a raised, horizontal position whereby said inlet in said first intake manifold is aligned with said combustion gases delivery means and said outlet in said first exhaust manifold is aligned with said first opening in said exhaust duct, means to pivotally engage an edge of said second grill in a first position parallel to and above said first grill and in a second retracted position, wherein said second intake manifold is matingly slidable with said intake duct for alignment of said inlet in said second intake manifold and said opening in said intake duct and said second exhaust manifold is matingly slidable with said exhaust duct for alignment of said outlet of said exhaust manifold and said second opening in said exhaust duct.

14. A cooking apparatus according to claim 13 wherein said inlet of said second intake manifold is located at said pivoting edge of said second grill.

15. A cooking apparatus according to claim 14 wherein said outlet of said second exhaust manifold is located at said pivoting edge of said second grill.

16. A cooking apparatus according to claim 15 further comprising an exhaust fan connected to said exhaust duct.

17. A cooking apparatus according to claim 16 wherein said frame comprises a stationary lower portion housing said means to slidably engage said first grill and a vertically extendable upper portion housing said intake duct and said means to pivotally engage said edge of said second grill.

18. A cooking apparatus according to claim 17 wherein said means to engage said edge of said second grill comprises means to maintain alignment of said outlet of said second exhaust manifold and said second opening in said exhaust duct when said second grill is vertically displaced.

19. A cooking apparatus according to claim 18, wherein said second intake manifold comprises a cylinder aligned along said edge of said second grill and sealed at both ends, a side of said cylinder is connected to said intake ends of said tubes and an opposite side of said cylinder has an elongated slot therein.

20. A cooking apparatus according to claim 18 wherein said second exhaust manifold conducts combustion gases from an opposite edge of said second grill along a perimeter of said second grill and back to said edge of said grill pivotally engaged with said support frame.

* * * * *